(No Model.)
R. UREN.
UNDERGROUND CONDUIT FOR ELECTRIC RAILROADS.
No. 548,481. Patented Oct. 22, 1895.
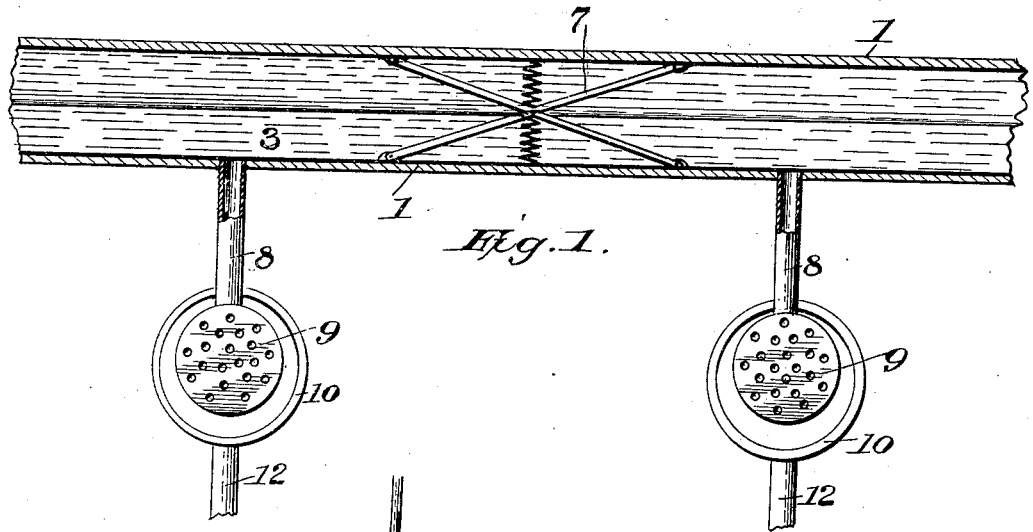
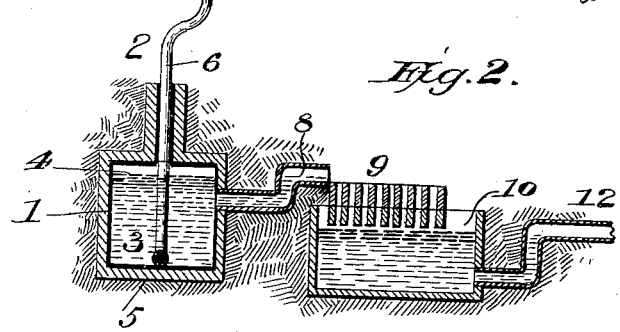
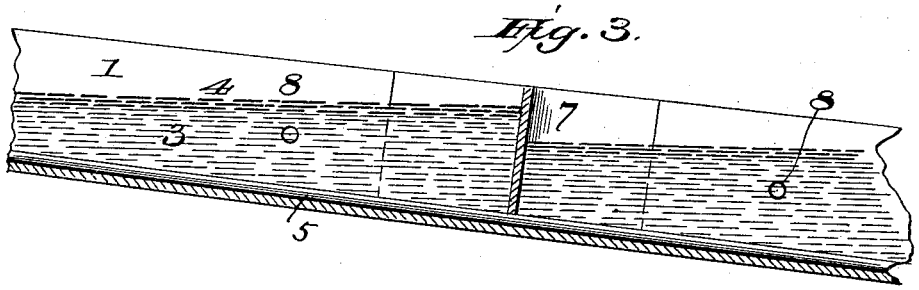
WITNESSES
F. L. Ouraud.
Bennett H. Jones
INVENTOR.
Richard Uren.
by Louis Dagger & Co.
Attorneys.

UNITED STATES PATENT OFFICE.

RICHARD UREN, OF HANCOCK, MICHIGAN.

UNDERGROUND CONDUIT FOR ELECTRIC RAILROADS.

SPECIFICATION forming part of Letters Patent No. 548,481, dated October 22, 1895.

Application filed May 10, 1894. Serial No. 510,724. (No model.)

*To all whom it may concern:*

Be it known that I, RICHARD UREN, a citizen of the United States, and a resident of Hancock, in the county of Houghton and State of Michigan, have invented certain new and useful Improvements in Underground Conduits for Electric Railroads; and I do hereby declare that the following is a full, clear, and exact description of the invention, which will enable others skilled in the art to which it appertains to make and use the same, reference being had to the accompanying drawings, which form a part of this specification.

My invention relates to improvements in conduits for electric railroads, and its object is to provide an open conduit in which the conductor is perfectly insulated and leakage and diffusion of the electric current are prevented.

The invention consists, essentially, in an open conduit of non-conducting material or of conducting material lined with suitable insulating material partly filled with water having a stratum of oil or other non-conducting fluid of a low specific gravity superimposed upon the water and a conductor located in said conduit and surrounded by the water, as hereinafter fully described and claimed.

In the accompanying drawings, Figure 1 is a central horizontal section of an underground conduit constructed in accordance with my invention. Fig. 2 is a cross-section of the same. Fig. 3 is a longitudinal section showing the construction of the conduit when the road is on a grade.

In the said drawings, the reference-numeral 1 designates a conduit of terra-cotta or other non-conducting material, as seen in Fig. 1, while in Fig. 2 the conduit is shown as made of metal with a lining of insulating material. Either of these styles of conduit may be employed, or any other found convenient or desirable, provided it is insulated from all surroundings. It is provided with the usual longitudinal slot or opening 2 for the passage of the conducting-arm of the car, by which the current is transmitted to the motor. This conduit is embedded in the ground between the track, as usual, and the ends of the different sections comprising the continuous conduit are so constructed or connected as to form a water-tight joint. The conduit is partly filled with water or other conducting fluid, as seen at 3, upon which is a stratum 4 of oil or other non-conducting fluid of a lower specific gravity than that of the conducting-fluid, so that it will float thereon.

The numeral 5 designates the conductor leading to the dynamo, preferably consisting of a continuous cylindrical wire resting on the bottom of the conduit and surrounded by the conducting-fluid.

The numeral 6 designates the conducting-arm by which the current is conducted from conductor 5 to the motor on the car and may be of any ordinary or suitable construction, having a semicircular recess in its lower end which contacts with the conductor.

By the above method it will be seen that, owing to the insulation of the conduit and the stratum of non-conducting fluid on top of the water, there will be no leakage or dispersion of the electric current, and that in case the conducting-arm jumps or is jolted up out of contact with the conductor the current will not be broken owing to the conducting fluid.

In case where a grade occurs in the road the conduit, Fig. 3, is provided with spring-actuated valves or gates 7 to prevent the oil and water from entering that portion of the conduit on the grade. These gates are automatically opened when the conducting-arm strikes the same and closed by the spring when said arm has passed.

The numeral 8 designates a laterally-extending pipe connected with the conduit and leading to a strainer 9. This strainer is connected with a trap 10, provided with a pipe 12, leading to a sewer or other similar place. The object of this construction is to allow any surplus water in the conduit to escape.

For the purpose of offering the least possible resistance in passing through the water and oil in the conduit the conducting-arm should have its front and rear portions formed with a knife-edge.

Having thus described my invention, what I claim is—

1. An open insulated conduit for electric railways, partly filled with water or other conducting fluid having a stratum of oil or other non-conducting fluid of less specific gravity superimposed thereon and a conductor located in said conduit and surrounded by the conducting fluid; substantially as described.

2. The combination with the open insulated conduit partly filled with water or other conducting fluid having a stratum of oil or other non-conducting fluid of less specific gravity superimposed thereon and a conductor located in said conduit, of the trap having a discharge pipe, the strainer connected therewith, and the pipe leading to the conduit, substantially as described.

In testimony that I claim the foregoing as my own I have hereunto affixed my signature in presence of two witnesses.

RICHARD UREN.

Witnesses:
  MATTHEW VAN ORDEN,
  WM. VAN ORDEN.